UNITED STATES PATENT OFFICE.

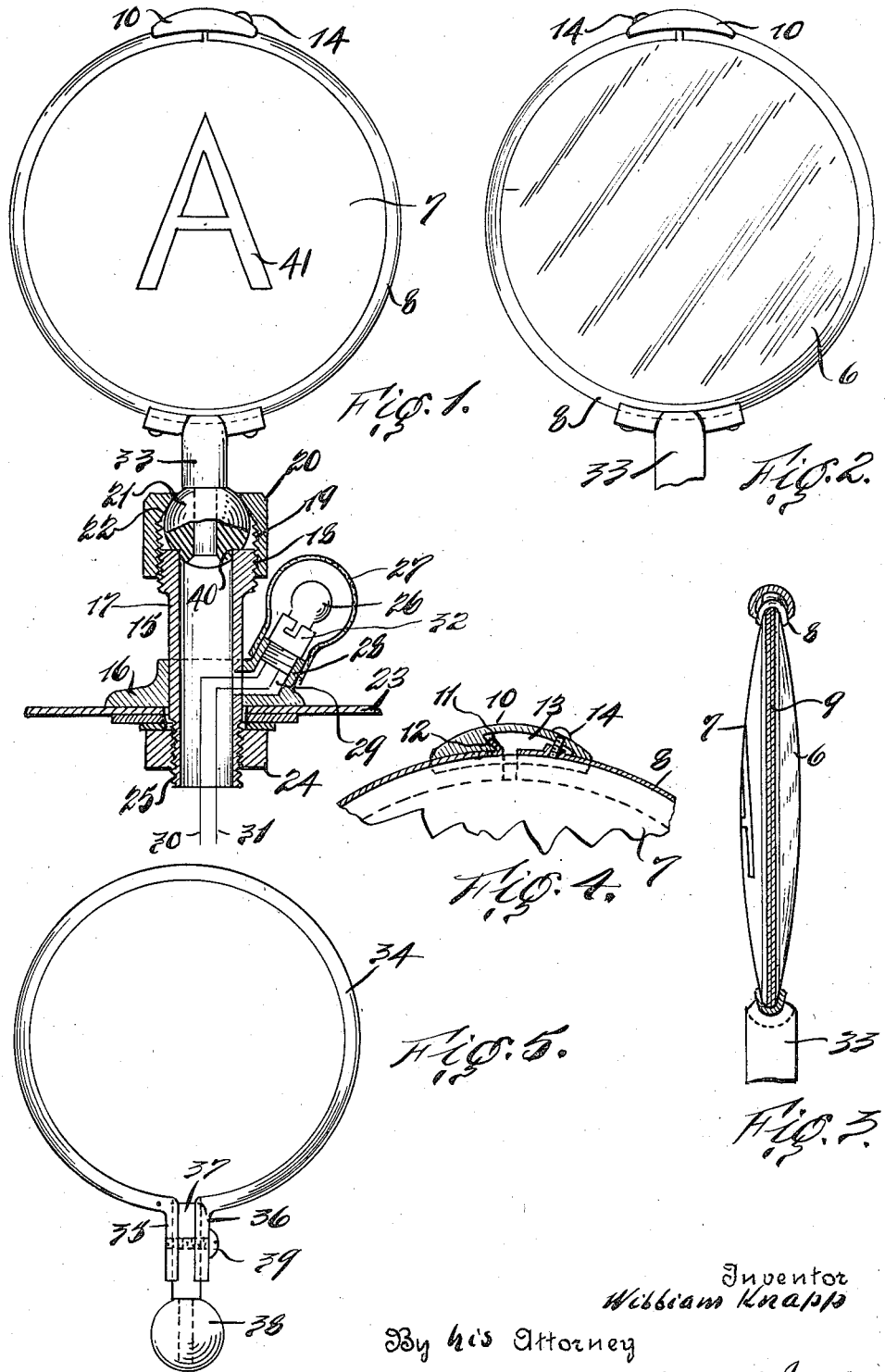

WILLIAM KNAPP, OF BAYONNE, NEW JERSEY.

VEHICLE-MIRROR.

1,377,355.  Specification of Letters Patent.  Patented May 10, 1921.

Application filed October 6, 1919. Serial No. 328,792.

*To all whom it may concern:*

Be it known that I, WILLIAM KNAPP, a citizen of Germany, residing at Bayonne, Hudson county, State of New Jersey, have invented certain new and useful Improvements in Vehicle-Mirrors, of which the following is a full, clear, and exact description.

This invention relates to improvements in automobile mirrors, that is to say, mirrors used to observe objects in the rear of such vehicles. One of the objects of the invention is to provide a combined mirror and plate upon which advertising matter, emblems, initials or other matter can be applied. To be more explicit, I provide a frame to retain a mirror and plate back to back, the mirror being directed toward the rear of the vehicle for the use above set forth. The main object of this combination is to enhance the appearance of an automobile mirror when viewed from the front of the vehicle by providing means upon which the initials of the owner of the vehicle can be applied in the form of a monogram or otherwise, an emblem, or other matter. The above is an outline of my invention, a more detailed description will follow.

Referring to the drawing forming part of this specification,

Figure 1 is a front view of my improvement, the support being illustrated in section;

Fig. 2 is a rear view of the frame, the support being omitted;

Fig. 3 is a cross-sectional view of the mirror frame, the mirror and plate being shown in elevation;

Fig. 4 is an enlarged sectional view, illustrating one way to secure the frame to the mirror and plate; and Fig. 5 illustrates a modified form of frame.

As herein embodied, my invention consists of a mirror 6 and a plate 7 which is non-reflecting or in other words is not a mirror. The mirror 6 and plate 7 are held by a frame 8, back to back and preferably separated by a pad 9 of paper or other suitable material. The frame 8 will be preferably split and expansible, it being held in closed position to grip the mirror and plate 7 by a suitable locking device or block 10. In this instance, one end of the ring is upturned as at 11 to engage the wall 12 of the recessed portion 13 of the block 10. The block 10 also carries a screw 14 to engage a threaded opening in the adjacent portion of the frame 8. After the mirror and plate have been applied to the frame, which in this instance is in the form of a concaved ring, the said frame will be compressed to engage the mirror and plate after which the locking block will be applied.

To support the mirror and plate, I provide a standard 15 consisting of a base member 16 and a post member 17 threaded as at 18 to engage the threads 19 of a nut 20. The post 17, in this instance, is tubular and coöperates with a ball member 21 made of lead or other soft material. The bore of the nut 20 is tapered as at 22 to engage the surface of the ball 21. The support or post 17 will be secured to the mud-guard of a vehicle, indicated by 23, by means of a nut 24, which engages the threaded end 25 of the post 17. The support 15 will be arranged to support an electric light bulb 26 and globe 27. In this instance, the base 16 carries a lug 28, having a bore 29 communicating with the bore of the post 17. The circuit wires 30 and 31 will be threaded through the above mentioned bores and attached to the socket 32. The ball 21, in this instance, is carried by a bracket 33 secured to frame 8.

Fig. 5 illustrates a split frame 34 having outturned ends 35 and 36 between which a stem 37 is inserted, said stem carrying the lead ball 38. A screw 39 serves to secure the frame and stem together and also binds the frame 34 securely to the mirror and frame. By means of my improved frame, the mirror 6 and plate 7 may be easily removed and replaced by others. By means of the lead ball 21 nut 20 and post 17, I am able to firmly secure the mirror in any adjusted position. After the mirror has been adjusted to suit the user, the nut 20 will be screwed home thereby forcing the edge 40 of the post into the soft material of the ball, after which the position of the mirror cannot be easily changed. The object of this form of ball joint is to provide a fastening that will remain fixed after it has been tightened. In other words, a fastening that will not be slackened by vibration. A suitable switch may be provided for the circuit for the lamp or bulb 26. The bulb or lamp may be used at night for parking or other purposes.

The provision of the plate 7, to receive monograms, advertising matter or the like, indicated herein by the numeral 41, greatly enhances the appearance of the mirror assembly when the vehicle is viewed from the front and also provides means whereby heretofore waste surface, the back of the mirror, can be put to use.

Having described my invention, what I claim is:—

1. The combination of a support having a relatively sharp edge, a mirror, means to adjustably connect the mirror and support consisting of a body of relatively soft material and means to force the said body against the sharp edge of the support.

2. An adjustable connection consisting of a support, having an indenting portion, a body of relatively soft material contacting with said indenting portion, and means to force the relatively soft body firmly against the indenting portion of the support.

Signed at New York city, N. Y. this 19th day of September, 1919.

WILLIAM KNAPP.

Witnesses:
 NICHOLAS VOLK,
 EDWARD A. JARVIS.